United States Patent
Osanai et al.

(10) Patent No.: US 7,054,237 B2
(45) Date of Patent: May 30, 2006

(54) OPTICAL DISK DEVICE

(75) Inventors: Norihiro Osanai, Akishima (JP); Naoto Takeda, Tokyo (JP)

(73) Assignee: TEAC Corporation, Musashino (JP)

( * ) Notice: Subject to any disclaimer, the term of this patent is extended or adjusted under 35 U.S.C. 154(b) by 460 days.

(21) Appl. No.: 10/183,807

(22) Filed: Jun. 26, 2002

(65) Prior Publication Data

US 2003/0043708 A1 Mar. 6, 2003

(30) Foreign Application Priority Data

Jun. 27, 2001 (JP) .............................. 2001-194165

(51) Int. Cl.
*G11B 7/095* (2006.01)

(52) U.S. Cl. .................. 369/44.25; 369/44.27

(58) Field of Classification Search ............. 369/44.25, 369/47.27, 47.28, 53.28, 53.31, 53.4, 59.22
See application file for complete search history.

(56) References Cited

U.S. PATENT DOCUMENTS

| | | | |
|---|---|---|---|
| 6,240,055 B1 * | 5/2001 | Takamine et al. ........ | 369/44.29 |
| 6,549,498 B1 * | 4/2003 | Inoue et al. .............. | 369/47.28 |
| 6,636,465 B1 * | 10/2003 | Kobayashi ............... | 369/44.26 |
| 6,678,220 B1 * | 1/2004 | Saga ........................ | 369/44.27 |
| 6,751,173 B1 * | 6/2004 | Maeda ..................... | 369/47.31 |

FOREIGN PATENT DOCUMENTS

| | | |
|---|---|---|
| JP | 2000251273 | 9/2000 |
| JP | 2000-353325 | 12/2000 |
| JP | 2002-32957 | 1/2002 |

\* cited by examiner

*Primary Examiner*—William Korzuch
*Assistant Examiner*—Joseph Haley
(74) *Attorney, Agent, or Firm*—Christensen O'Connor Johnson Kindness PLLC

(57) ABSTRACT

An optical disk device for driving an optical disk having an emboss section and a data section comprises an optical pickup for replaying address information by irradiating a laser beam onto the emboss section of an optical disk and writing data by irradiating the laser beam onto the data section of the optical disk, and a control unit for controlling the focus position when address information is replayed at the emboss section and the focus position when data are written onto the data section to a common focus position. By using the common focus position as the focus position when the emboss section is replayed and as the focus position when the data are written to the data section, it is possible to eliminate any need for rapidly switching the focus position at the boundary between the emboss section and the data section.

13 Claims, 6 Drawing Sheets

OPTICAL DISK DEVICE

BACKGROUND OF THE INVENTION

1. Field of the Invention

The present invention relates to an optical disk device, and in particular, to a device for writing data onto an optical disk having an emboss section (or a header section) and a data section.

2. Description of the Related Art

In many recordable optical disks, such as the DVD-RAM disk shown in FIGS. 6A and 6B, each sector 104 comprises a header section (emboss section) 104a and a data section 104b. In the emboss section 104a, address information of the sector is formed. The address information is generally constructed from 4 address data. Because these 4 address data are identical, the address information of the sector can be obtained as long as any one of address datum among the four data can be replayed. When replaying, first, a beam of focused laser light (a laser beam) is set at a replaying power to replay the emboss section 104a to obtain the address information, and then the data section 104b is replayed and a replay RF signal is demodulated. When writing, first, the emboss section 104 is replayed at the replaying power to obtain the address information, and then the power of the laser beam is increased to the writing power and data are written onto the data section 104b.

However, because the emboss section and data section have disk characteristics that are physically different from each other, the optimal control parameters for the cases when the emboss section is replayed and when the data section is replayed or written are different. For example, an optimal focus offset for the emboss section and an optimal focus offset for the data section are different.

In light of this situation, Japanese Patent Laid-Open Publication No. 2000-251273, for example, discloses switching of the control parameters during the seek process for an optical disk. More specifically, this reference discloses that parameters for emboss are used when the emboss section 104a is replayed and the parameters are switched to those for data when the data section 104b is replayed.

However, considering the response characteristics of focus actuators, it is difficult to instantaneously (discontinuously) change the focus position at the boundary between the emboss section 104a and the data section 104b, and, in reality, the focus position is set at the desired position after the laser beam has already proceeded some distance into the data section 104b. Thus, it has been difficult to reliably replay the data section 104b or to reliably write data onto the data section 104b.

During replay, both emboss section 104a and the data section 104b are replayed at the replaying power, and, thus, the difference in the focus offset is relatively small. However, during writing in which the emboss section 104a is replayed at the replaying power and data are written onto the data section 104b at a writing power, the optimal focus position for the emboss section 104a significantly differs from the optimal focus position for the data section 104b. As a result, it is not possible to rapidly change the focus position at the boundary between the emboss section 104a and the data section 104b. In such a case, if the focus position is fixed at the optimal writing focus position and the emboss section 104a is replayed, the address information may not be obtained, or, even when obtained locally, the address information cannot be constantly obtained over the entire regions of the optical disk 100, and, thus, data cannot be written consistently. On the other hand, when the data are written onto the data section 104b at the optimal replaying focus position, there is a problem in that the writing quality may be degraded, such as, for example, increase in jitter.

SUMMARY OF THE INVENTION

Accordingly, an object of the present invention is to provide an optical disk device which can replay data (for example, address information) from the emboss section and in which data can be written onto the data section.

According to one aspect of the present invention, there is provided an optical disk device comprising means for replaying address information by irradiating a laser beam onto an emboss section of an optical disk and for writing data by irradiating a laser beam onto a data section of the optical disk, and means for controlling the focus positions of the means for replaying and writing when replaying address information at the emboss section and when writing data onto the data section to a common focus position. By setting the focus positions for replaying the emboss section and for writing data onto the data section to a common focus position, it is not necessary to rapidly switch the focus position at the boundary between the emboss section and the data section. As a common focus position, for example, the optimal writing focus position when data are written onto the data section maybe employed, although at this position it may be difficult to replay the emboss section. For example, when the address information is to be replayed from the emboss section, the reproducibility rate may be degraded. Therefore, according to another aspect of the present invention, a position shifted from the optimal writing focus position is set as the common focus position. The direction of shift is determined such that the reproducibility of the emboss section is improved. According to yet another aspect of the present invention, the optimal writing focus position is shifted towards the optimal replaying focus position which is optimal for replaying the emboss section.

The present invention can be more readily understood by referring to the following embodiment. The embodiment, however, is presented for the purpose of exemplifying only, and is not intended in any way to limit the scope of the present invention.

DESCRIPTION OF PREFERRED EMBODIMENT

Figure 1:
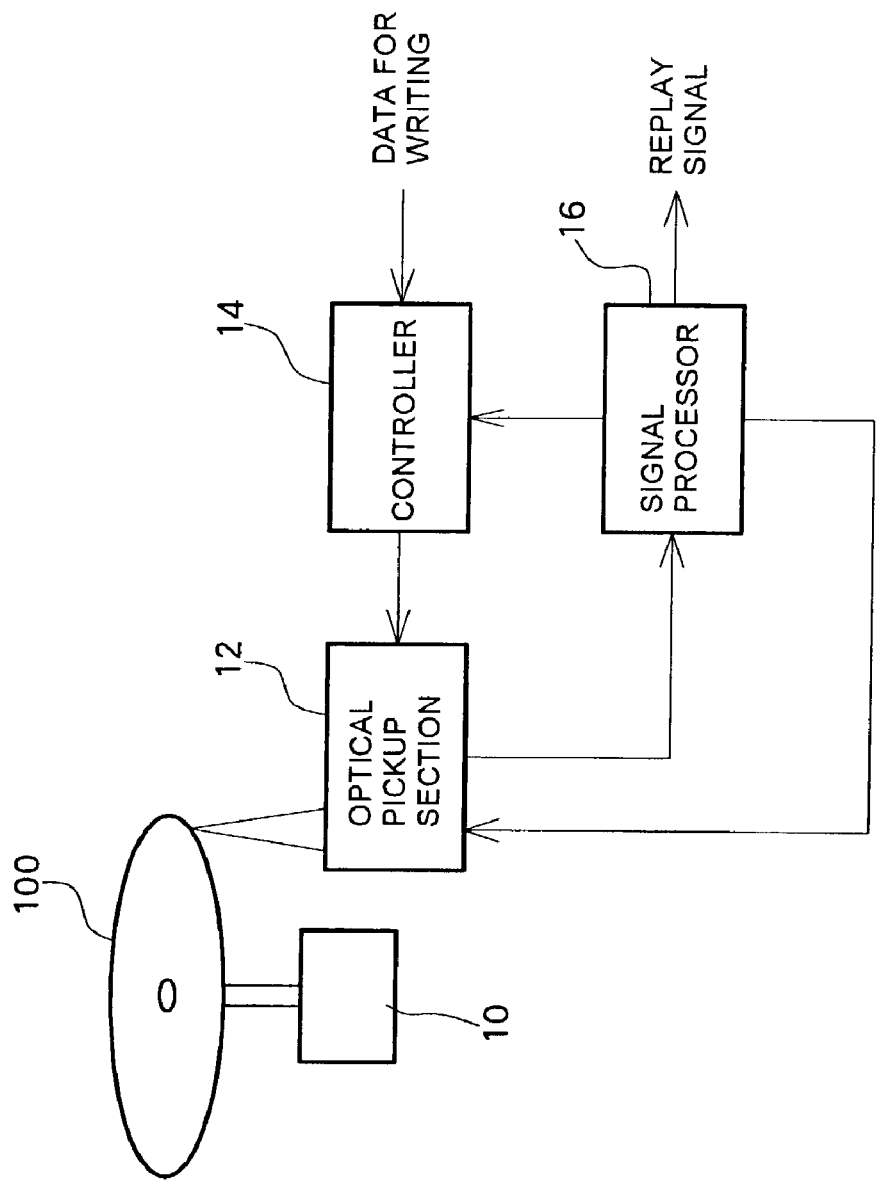
FIG. 1 is a block diagram showing important structures of an optical disk device.

The preferred embodiment of the present invention (hereinafter referred to as "the embodiment") will now be described referring to the drawings.

FIG. 1 is a block diagram showing significant components of an optical disk device according to the embodiment. The optical disk device comprises an optical pickup section 12, a controller 14, and a signal processor 16.

The optical pickup section 12 irradiates a laser beam onto an optical disk 100 such as a DVD-RAM disk which is rotationally driven by a spindle motor 10, for writing or replaying data. When replaying data, the optical pickup section 12 irradiates a laser beam at a replaying power and outputs a replay RF signal to the signal processor 16. When writing data, on the other hand, the optical pickup section 12 irradiates a laser beam at a writing power according to a write signal from the controller 14 and writes data. When writing data, the emboss section 104a of each sector is replayed at the replaying power and address information is obtained at the signal processor 16, and data are written to the data section 104b of the sector at the writing power. The writing power is greater than the replaying power.

The controller 14 produces a write signal from data to be written and supplies the write signal to the optical pickup section 12, while simultaneously servo controlling the tracking and focus of the optical pickup section 12. The tracking is controlled based on a tracking error signal from the signal processor 16. Similarly, the focus is controlled based on a focus error signal from the signal processor 16. When replaying, the controller 14 controls the focus position by an optimal replaying focus offset which is set in advance. In general, although the optimal replaying offsets for the emboss section and for the data section differ from each other, the difference is relatively small. Therefore, the emboss section and data section are replayed at, for example, the optimal focus offset for the data section. When writing, rather than writing data at a preset focus offset which is optimal for writing, the controller 14 writes data at an offset shifted from the preset "optimal" writing focus offset. In this manner, it is possible to inhibit situations in which the emboss section cannot be replayed because it is being replayed at the optimal writing focus offset, and to enable replay of the address in the emboss section 104a and writing of data onto the data section 104b.

A replay RF signal is input to the signal processor 16 from the optical pickup section 12. In addition to producing a tracking error signal and a focus error signal, the signal processor 16 demodulates data written to the data section 104b and outputs the data. During the process of determining the optimal replaying focus offset and/or the optimal writing focus offset, the signal processor 16 detects jitter and/or error rate in the replay RF signal and supplies to the controller 14.

Figure 2A:
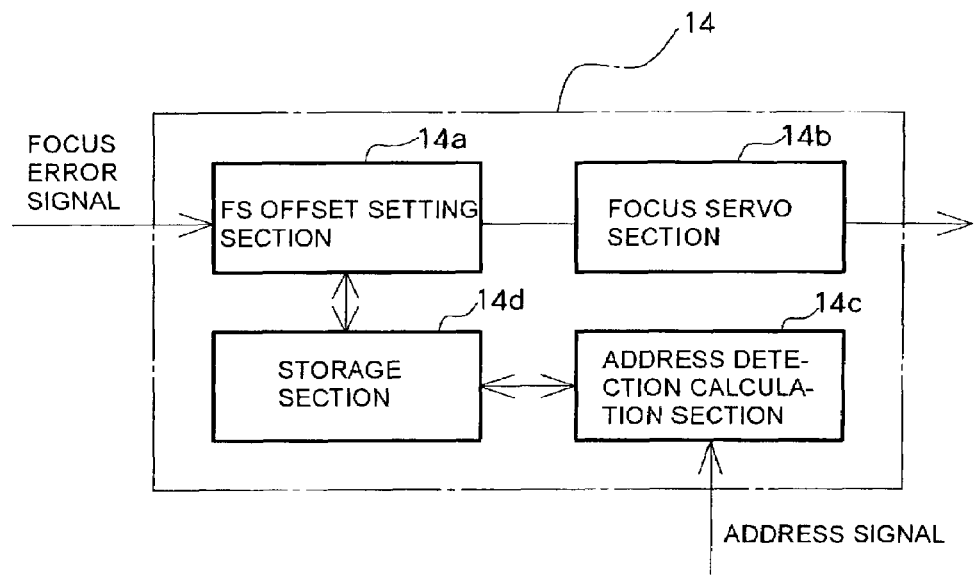
FIG. 2A is a functional block diagram of the controller shown in FIG. 1.

FIG. 2A is a block diagram showing a structure of the controller 14 shown in FIG. 1. In FIG. 2A, the servo system for tracking is not shown. A focus error signal from the signal processor 16 is supplied to a focus (FS) offset setting section 14a. The FS offset setting section 14a adjusts the FS offset based on control parameters stored in a storage section 14d and controls the focus position of the optical pickup section 12 through a focus servo section 14b by moving the objective lens of the optical pickup section 12 in a direction towards or away from an optical disk. When replaying, the FS offset setting section 14a sets the FS offset at an optimal replaying FS offset Fsor stored in the storage section 14d, and the emboss section 104a and the data section 104b are replayed. When writing, the FS offset setting section 14a sets the FS offset at an offset obtained by shifting, by Δf, an optimal writing FS offset stored in the storage section 14d, and the emboss section 104a is replayed and data are written onto the data section 104b. The amount of shift, Δf, may be a fixed value stored in the storage section 14d in advance. In the example of the embodiment, Δf is set so that the FS offset is shifted to fall within a range of offsets shifted from the optimal replaying focus offset and in which the address can be replayed at a predetermined threshold value or greater. The optimal writing FS offset is shifted towards the optimal replaying FS offset so as to increase the probability that the emboss section 104a can be replayed. The range in which the address can be replayed at a predetermined threshold value or greater is found by an address detection rate calculation section 14c and is stored in the storage section 14d.

Figure 2B:
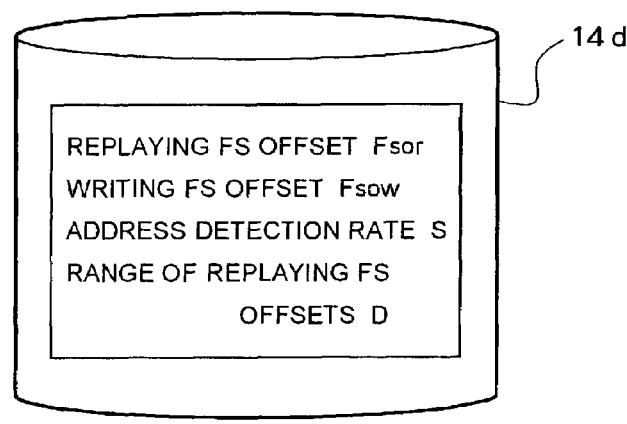
FIG. 2B is a diagram for explaining the contents stored in the storage section of FIG. 2A.

FIG. 2B shows the control parameters stored in the storage section 14d. The storage section 14d stores the optimal replaying FS offset Fsor, the optimal writing FS offset Fsow, an address detection rate S which is the predetermined threshold value, and the range D of replaying FS offset in which address detection rate S can be obtained.

The address detection rate S can be set arbitrarily. For example, in a DVD-RAM 4.7GB disk, 25 sectors are present within a rewritable data zone in the lead-in area, and, thus, a total of 4×25=100 addresses are present in the header section (emboss section) in one rotation. It is possible, for example, to represent the reproducibility by the percentage, with respect to the total number of sectors, of the number of sectors in which all 4 addresses are detected, and to set the threshold value S at 20/25. In this configuration, it is judged that an address can be detected when the number of sectors in which all 4 addresses are detected exceeds 20, otherwise, it is judged that the address cannot be detected. Alternatively, it is also possible to employ other methods. For example, it is possible to use the sum of the number of sectors in which any of the 4 addresses can be detected, set the threshold value S equal to 80%, and judge that the address can be replayed when the sum exceeds 80, and otherwise judge that the address cannot be replayed.

The optimal replaying FS offset Fsor is defined as the offset in which jitter is minimized when data are replayed while the FS offset is varied. Similarly, the optimal writing FS offset Fsow is defined as the offset in which jitter is minimized when data are written while varying the FS offset and the written data are replayed at the optimal replaying FS offset Fsor.

The FS offsets in the embodiment are summarized in Table 1 shown below. Once the FS offset is set, the focus position, that is, the position of the objective lens of the optical pickup, is univocally determined.

TABLE 1

|  | EMBOSS SECTION | DATA SECTION |
| --- | --- | --- |
| REPLAY | Fsor | Fsor |
| WRITE | Fsow + Δf | Fsow + Δf |

When writing, an address is replayed from the emboss section at a replaying power and data are written onto the data section at a writing power. It should be noted that, in the example illustrating the embodiment, replay of address at the emboss section and writing of data in the data section are both performed at the same FS offset. By using the same FS offset as the FS offset for the emboss section and the FS offset for the data section, it is possible to eliminate any need for switching the FS offset at the boundary between the emboss section and the data section. For comparison, a case in which the optimal FS offset is used when writing is shown in Table 2. The characteristics of the embodiment should be apparent from Table 2.

TABLE 2

|  | EMBOSS SECTION | DATA SECTION |
| --- | --- | --- |
| REPLAY | Fsor | Fsor |
| WRITE | Fsor | Fsow |

When writing, the controller 14 sets the FS offset at an offset obtained by shifting, by Δf, the optimal writing FS offset Fsow stored in the storage section 14d in the direction towards the optimal replaying FS offset, also stored in the storage section 14d, and the emboss section 104a is replayed and the data are written onto the data section 104b at the set FS offset. However, although data can be written onto the data section 104b under a preferable condition, because the FS offset is shifted from the optimal value Fsow, the conditions under which data are written may not be optimal. Therefore, it is also preferable to employ other methods, such as, for example, changing the filtering characteristics in the process at the signal processor 16 of demodulating address information from a replay RF signal and shifting the writing FS offset Fsow in cases wherein the address in emboss section 104a cannot be replayed at a sufficient reproducibility even after the filtering characteristics are changed. This configuration will now be described.

Figure 3:
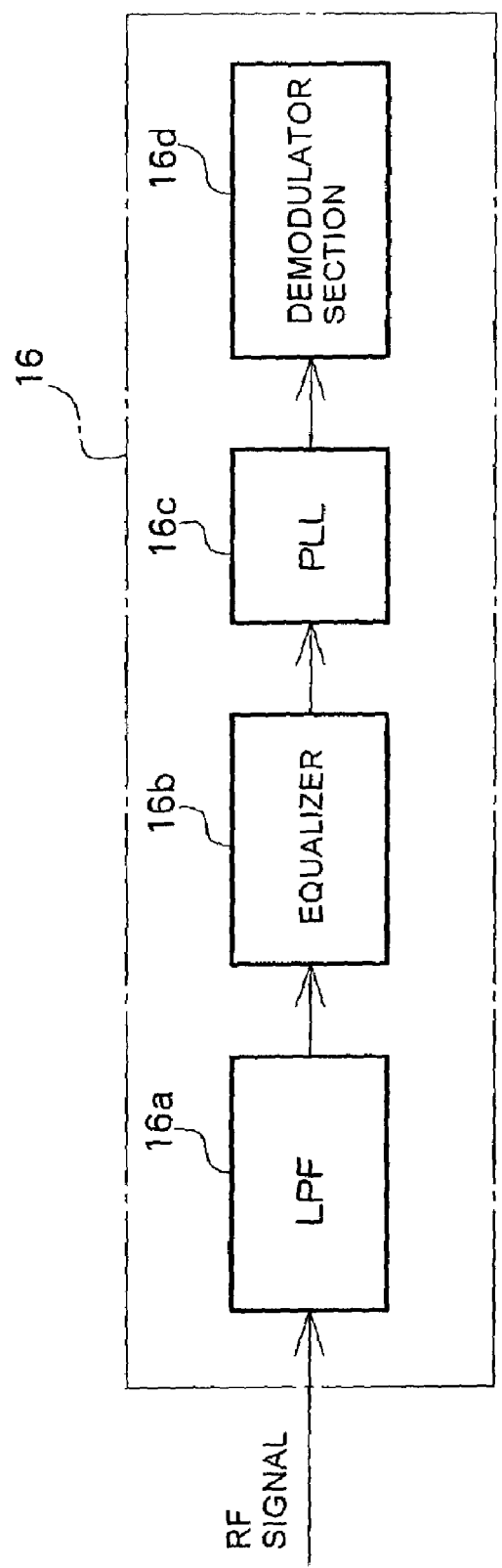
FIG. 3 is a functional block diagram of the signal processor of FIG. 1.

FIG. 3 is a diagram showing important structures of the signal processor 16. The signal processor 16 comprises a low pass filter (LPF) 16a, an equalizer 16b, a PLL (Phase Locked Loop) circuit 16c, and a demodulator 16d.

The LPF 16a removes high frequency noise from the replay RF signal and outputs the resulting signal to the equalizer 16b. The equalizer 16b boosts a predetermined frequency band, in particular, around 3T, of the replay RF signal and outputs to the PLL circuit 16c. The PLL circuit 16c produces a clock from the input signal, and the demodulator circuit 16d demodulates the address in the emboss section 104a or the data written to the data section 104b based on the clock.

As described, the signal processor 16 processes a predetermined frequency band by boosting in the frequency band. When the address reproducibility is low, the address reproducibility can be improved to a certain degree by changing (increasing) the amount of boost. If satisfactory reproducibility cannot be achieved when the emboss section 104a is replayed at the optimal writing FS offset Fsow, the controller 14 first changes the filtering characteristics, more specifically, increases the amount of boost in the equalizer 16b. If satisfactory reproducibility cannot be obtained, even after the filtering characteristics are changed, the controller 14 shifts the optimal writing offset Fsow by Δf.

Figure 4:
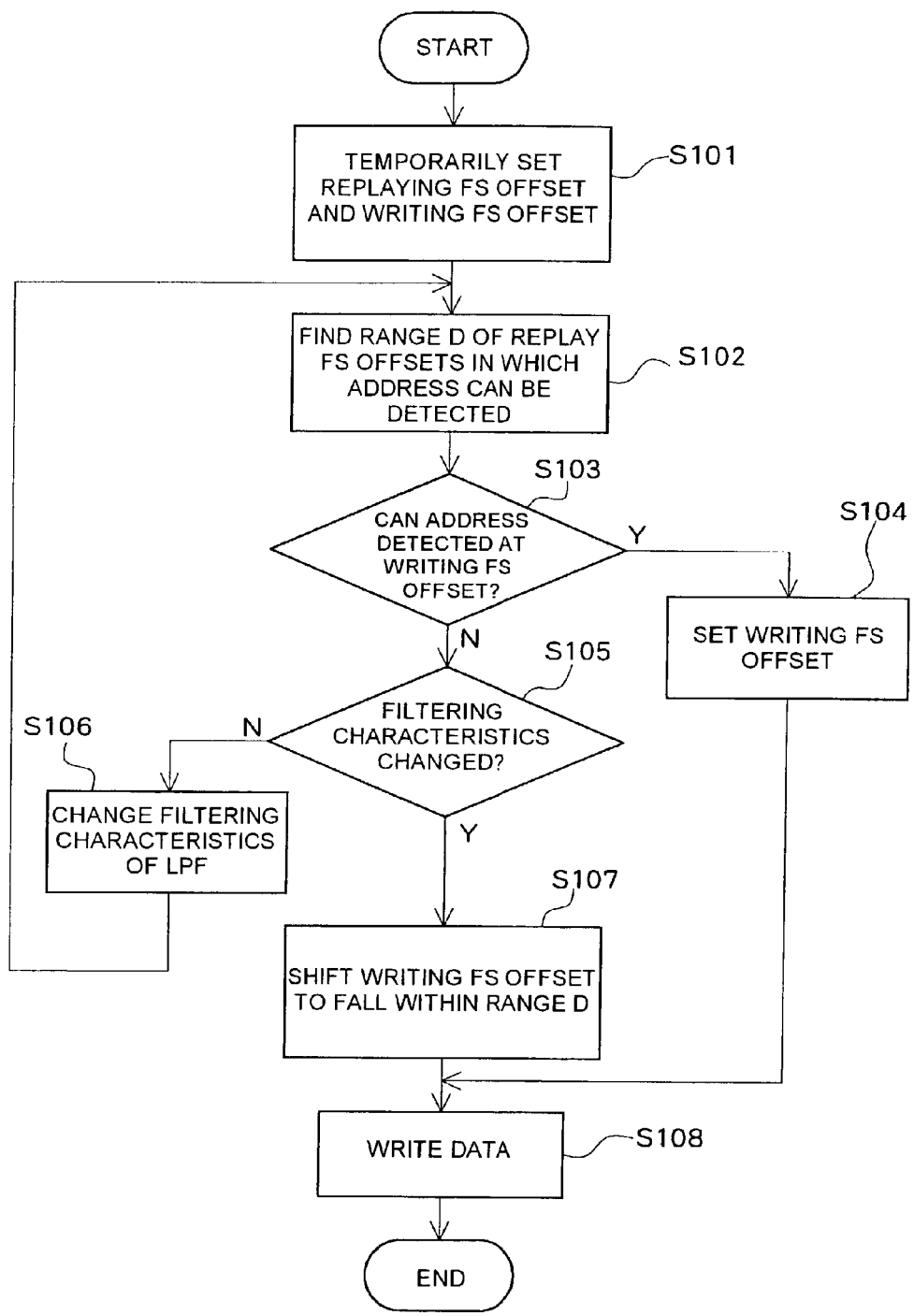
FIG. 4 is a process flowchart.

FIG. 4 is a flowchart showing the process in the controller 14. The controller 14 first sets the optimal replaying FS offset Fsor and temporarily sets the optimal writing FS offset (step S101) The setting is "temporary" because the writing offset Fsow may be shifted later so that data may be written at the shifted offset (Fsow+Δf).

Next, the controller 14 finds a range D for replaying FS offsets in which the address can be detected (replayed) (step S102). More specifically, address signals demodulated within one rotation while varying the replaying FS offset are supplied from the signal processor 16 to the address detection rate calculation section 14c. The address detection rate calculation section 14c calculates reproducibility from the address signals and compares the calculated value with the threshold value S stored in the storage section 14d. It is then judged whether the reproducibility exceeds the S value, and the range in which the reproducibility exceeds the S value is stored as the range D in the storage section 14d.

After the range D is found, it is judged whether the optimal writing FS offset Fsow falls within this range D (step S103). When the optimal writing FS offset Fsow falls within the range D, it is possible to replay the address even when the emboss section 104a is replayed at the writing FS offset Fsow, and, therefore, the FS offset Fsow which has been temporarily set as the writing FS offset in step S101 is set as the writing FS offset (step S104).

On the other hand, when the writing FS offset Fsow does not fall within the range D, it is not possible to replay address in the emboss section 104a at the writing FS offset Fsow, and the process proceeds to judging whether the filtering characteristics of the signal processor 16 have been changed (step S105). If the filtering characteristics have not been changed, the filtering characteristics are changed (step S106) and the process returns to step S102. A change in the filtering characteristics is, for example, an increase in the amount of boost for the equalizer as described above. After the filtering characteristics are changed, the range D is again found, and it is judged whether the writing FS offset Fsow is within the range D. If the writing FS offset Fsow is within the range D, the writing FS offset Fsow which has been temporarily set as the writing FS offset in step S101 is set as the ultimate writing FS offset without shifting the writing FS offset Fsow (step S104).

When the writing FS offset Fsow is not within the range D even after the filtering characteristics are changed, it is judged in step S105 as "yes" and the writing FS offset Fsow is shifted (step S107).

Figure 5:
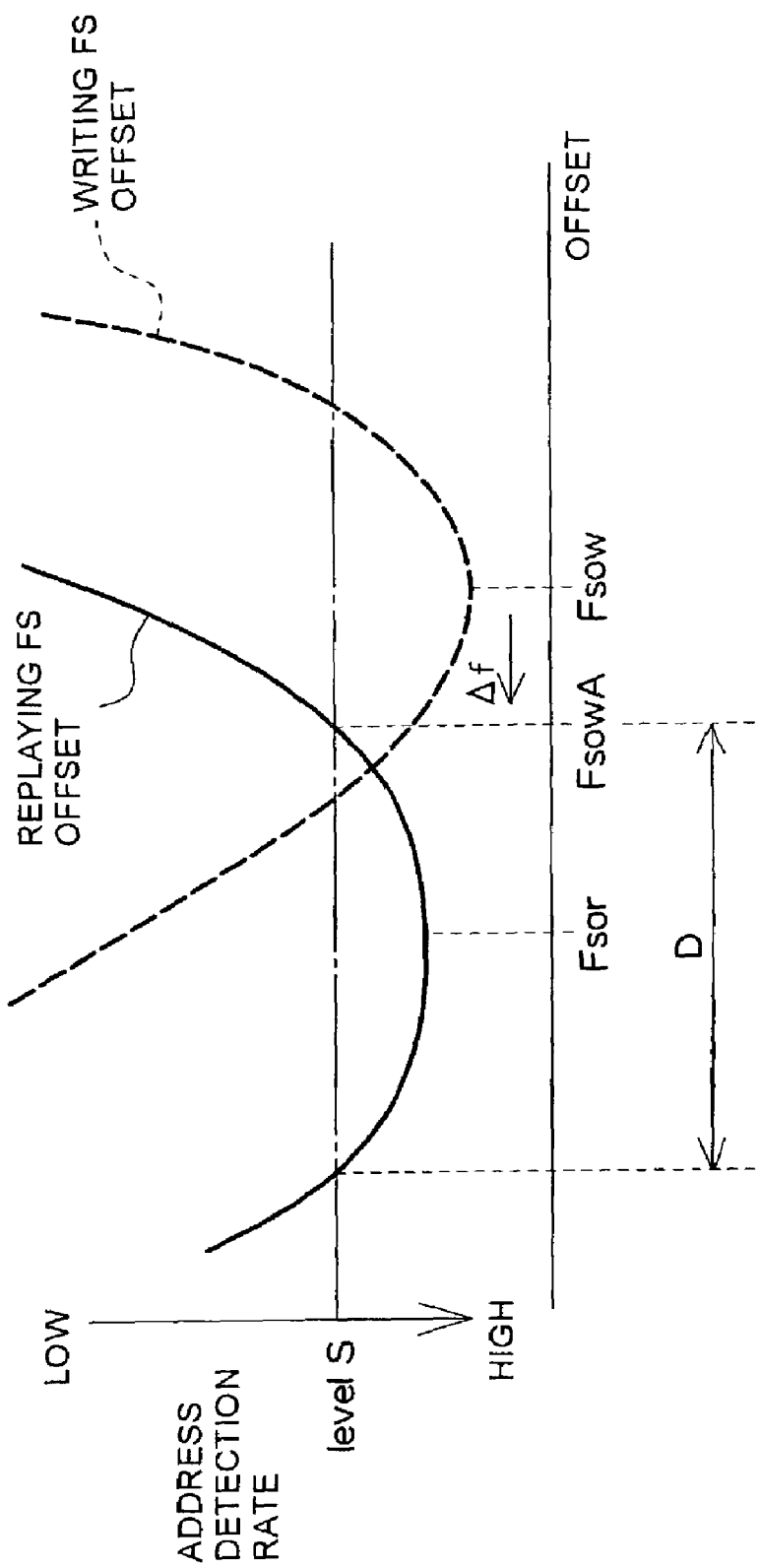
FIG. 5 is a graph showing a shift in writing focus offset.
Figure 6A:
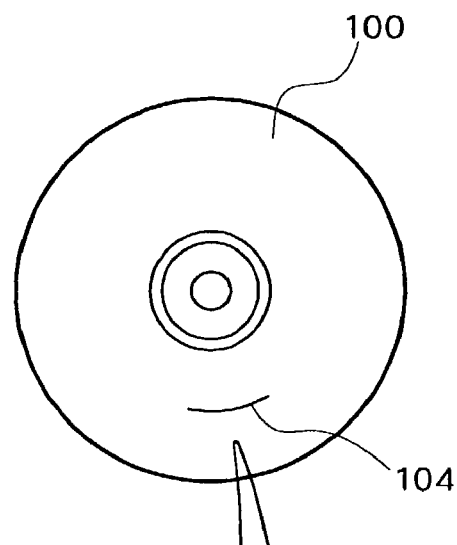
FIG. 6A is a diagram for explaining an optical disk.
Figure 6B:
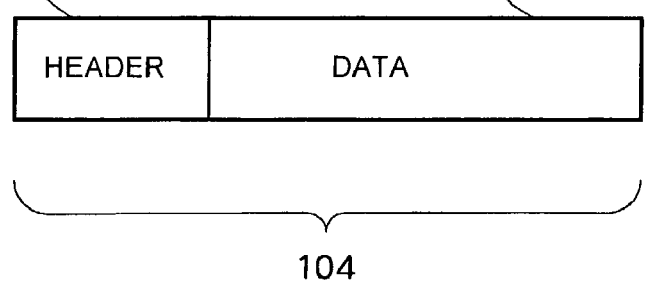
FIG. 6B is a diagram for explaining an emboss section and a data section of the optical disk shown in FIG. 6A.

FIG. 5 is a schematic diagram showing the shift process in step S107. In FIG. 5, the horizontal axis represents the amount of offset and the vertical axis represents the address detection rate. In FIG. 5, the solid line indicates the change in address detection rate when the replaying FS offset is varied. For this line, jitter is minimized and the address detection rate is maximized at Fsor. The range in which the address detection rate exceeds the S value is the range D. On the other hand, the dotted line indicates the variation in the writing FS offset, and the jitter is minimized at the optimal writing FS offset Fsow. In general, Fsow and Fsor do not coincide, and when Fsow is not within the range D, Fsow is shifted by Δf to an offset within the range D, as shown in FIG. 5 (shown by an arrow in FIG. 5). When the writing FS offset is shifted, it is preferable that the writing FS offset is shifted to an offset FsowA within the range D which is closest to the writing FS offset Fsow.

After the writing FS offset is determined as described above, the emboss section 104a is replayed at the writing FS offset to replay the address and the data are written to the data section 104b (step S108).

As described, when the emboss section 104a cannot be replayed at an FS offset Fsow which is optimal for writing, the filtering characteristics are first changed and then the writing FS offset Fsow is shifted. In this manner, the emboss section 104a can be replayed and data can be written onto the data section 104b.

FS offsets are summarized in the following Tables 3 and 4.

When optimal writing FS offset Fsow is within range D

TABLE 3

|  | EMBOSS SECTION | DATA SECTION |
|---|---|---|
| REPLAY | Fsor | Fsor |
| WRITE | Fsow | Fsow |

When optimal writing FS offset Fsow is outside of range D

TABLE 4

|  | EMBOSS SECTION | DATA SECTION |
|---|---|---|
| REPLAY | Fsor | Fsor |
| WRITE | FsowA | FsowA |

Here, FsowA=Fsow+$\Delta$f.

A preferred embodiment of the present invention has been described. However, the present invention is not limited to the example used to illustrate the embodiment, and various modifications can be employed. For example, when the reproducibility is at such a level that one of the 4 addresses can be replayed when the emboss section 104a is replayed at the optimal writing offset Fsow, it is possible to change the filtering characteristics so that the reproducibility is at a level in which two or more of the 4 addresses can be replayed, and further, to shift the writing FS offset Fsow so that the reproducibility becomes a level in which all 4 addresses can be replayed.

Moreover, because the optimal writing FS offsets when writing onto a groove differs from that when writing onto a land, it is also preferable to perform the above processes separately for the land and for the groove.

In addition, although in the embodiment a DVD-RAM has been described, because in a CD-R meandering channels (wobbles) are periodically formed in a predetermined period on an optical disk 100, it is possible when appropriate to shift the writing FS offset from the optimal value during writing so that the wobbles can be replayed. In such a situation, the wobbles can be considered as corresponding to the emboss section.

In the embodiment, the focus offset is used to adjust the focus position by driving the objective lens in the optical pickup 12 in the direction towards or away from the optical disk 100. The focus offset is applied to the focus servo signal for adjusting the focus position. Therefore, it is easily conceivable that the setting and shift in the focus offset can be equivalent to adjusting the focus position.

In the embodiment, two techniques for processing are described. In the first technique, the focus position is set at a common focus position between the optimal replaying focus position and the optimal writing focus position without changing the processing parameters of the replay signal (for example, the amount of boost for the equalizer). The common focus position is a focus position shifted from the optimal writing focus position towards the optimal replaying focus position, and therefore, is between the optimal replaying focus position and the optimal writing focus position. The second technique involves changes to the processing parameters of replay signals. First, the common focus position is temporarily set at the optimal writing focus position, and replay at the emboss section and writing onto the data section are performed. When the reproducibility of address information in the emboss section matches or exceeds a threshold value, the optimal writing focus position is set as the ultimate common focus position. In such situations, because the writing onto the data section can also be performed at the optimal writing focus position, the obtained results are also preferable from the viewpoint of writing quality. If the reproducibility of the address information is below the threshold value, on the other hand, the amount of boost in the equalizer is increased in order to improve the reproducibility of the address information. If the reproducibility of address information is then still less than the threshold value, even after the amount of boost is increased, the optimal writing focus position is shifted towards the optimal replaying focus position and the shifted position is set as the common focus position.

In addition to these two configurations, there are many more alternatives. For example, it is also possible to set the midpoint value between the optimal replaying focus position and the optimal writing focus position as the common focus position. The midpoint is temporarily set as the common focus position and the reproducibility of or jitter in the replay signal is detected. When the reproducibility or the jitter is within an acceptable level, the midpoint value is set as the ultimate common focus position. Otherwise, the reproducibility of the address information and the reproducibility at the data section are compared and the midpoint value position is shifted towards the focus position in which the reproducibility is smaller. For example, when the address information is replayed and data are written onto the data section at the midpoint value, and the reproducibility of the address information is within an acceptable level but the jittering of replay signal of data written to the data section is not, the midpoint value is shifted slightly towards the optimal writing focus position. By repeating this process as necessary, it is possible to search for and determine the truly optimal focus position.

What is claimed is:

1. An optical disk device comprising:

means for replaying address information by irradiating a laser beam onto an emboss section of an optical disk and for writing data by irradiating a laser beam onto a data section of said optical disk;

means for controlling the focus positions of said means for replaying and writing when replaying address information at said emboss section, respectively, and when writing data onto said data section to a common focus position; and means for detecting reproducibility of said address information, wherein when a reproducibility value determined by replaying said emboss section at an optimal focus position for writing data onto said data section is greater than or equal to a threshold value, said means for controlling sets said optimal focus position as said common focus position, and when said reproducibility value is less than said threshold value, said means for controlling sets a focus position different from said optimal focus position as said common focus position.

2. A device according to claim 1, wherein said different focus position is a position shifted from said optimal focus position so that said reproducibility is greater than or equal to said threshold value.

3. A device according to claim 1, wherein
said different focus position is a position shifted from said optimal focus position towards the optimal focus position when replaying address information at said emboss section.

4. An optical disk device comprising:
means for replaying address information by irradiating a laser beam onto an emboss section of an optical disk and for writing data by irradiating a laser beam onto a data section of said optical disk;
means for controlling the focus positions of said means for replaying and writing when replaying address information at said emboss section, respectively, and when writing data onto said data section to a common focus position;
means for filtering a replay signal when replaying address information at said emboss section; and
means for detecting reproducibility of said address information, wherein
said means for setting changes the filtering characteristics of said means for filtering when the reproducibility determined by replaying the data in said emboss section at the optimal focus position when writing data onto said data section is less than a threshold value.

5. A device according to claim 4, wherein said means for filtering comprises:
an equalizer for boosting a predetermined frequency band of said replay signal, wherein
said means for controlling increases the amount of boost of said equalizer.

6. A device according to claim 4, wherein
when the reproducibility after said filtering characteristics are changed is greater than or equal to said threshold value, said means for controlling sets, as said common focus position, said optimal focus position.

7. A device according to claim 4, wherein
when the reproducibility after said filtering characteristics are changed is less than said threshold value, said means for controlling sets, as said common focus position, a focus position different from said optimal focus position.

8. A device according to claim 7, wherein
said different focus position is a position shifted from said optimal focus position so that said reproducibility is greater than or equal to said threshold value.

9. A device according to claim 7, wherein
said different focus position is a position shifted from said optimal focus position towards the optimal focus position when address information is replayed at said emboss section.

10. An optical disk device comprising:
means for replaying address information by irradiating a laser beam onto an emboss section of an optical disk and for writing data by irradiating a laser beam onto a data section of said optical disk;
means for controlling the focus positions of said means for replaying and writing when replaying address information at said emboss section, respectively, and when writing data onto said data section to a common focus position;
means for storing a writing focus offset value which defines the optimal focus position when data are written onto said data section; and
means for detecting reproducibility of said address information, wherein
when reproducibility obtained by replaying said emboss section at said writing focus offset value stored in said means for storing is greater than or equal to a threshold value, said means for controlling uses said writing focus offset value as the offset value, and
when said reproducibility is less than said threshold value, said means for controlling sets an offset value different from said writing focus offset value.

11. A device according to claim 10, wherein
said different offset value is a value shifted from said writing focus offset value so that said reproducibility is greater than or equal to said threshold value.

12. A device according to claim 10, further comprising:
means for storing a replaying focus offset value which defines the optimal focus position when address information is replayed at said emboss section, wherein
said different offset value is a value shifted from said writing focus offset value towards said replaying focus offset value.

13. An optical disk device comprising:
an optical pickup for replaying address information by irradiating a laser beam of a replaying power onto an emboss section of an optical disk and for writing data by irradiating a laser beam of a writing power onto a data section of said optical disk;
a control unit for controlling the focus position of said optical pickup, wherein said control unit sets the focus position of said optical pickup to a focus position different from an optimal writing focus position when data are written onto said data section, and performs both replaying of address information and writing of data using said focus position different from the optimal writing focus position; and
an equalizer for boosting a replay signal from said optical pickup, wherein
when reproducibility obtained by replaying said address information at said optical writing focus position is less than a threshold value, said control unit increases the amount of boost in said equalizer, and
when, after said amount of boost is increased, the reproducibility is still less than said threshold value, said control unit controls said focus position of the optical pickup to said different focus position.

* * * * *